United States Patent
Miyamoto et al.

(10) Patent No.: US 6,294,641 B1
(45) Date of Patent: Sep. 25, 2001

(54) POLYCARBONATE RESIN, OPTICAL-INFORMATION RECORDING MEDIUM SUBSTRATE MADE OF THE SAME, AND OPTICAL-INFORMATION RECORDING MEDIUM

(75) Inventors: Masaaki Miyamoto, Fukuoka; Motonori Ueda, Okayama; Kiyoji Kuma, Fukuoka; Ryuji Uchimura, Fukuoka; Yoshitaka Shiraishi, Fukuoka, all of (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/381,278
(22) PCT Filed: Jan. 14, 1999
(86) PCT No.: PCT/JP99/00113
  § 371 Date: Sep. 20, 1999
  § 102(e) Date: Sep. 20, 1999
(87) PCT Pub. No.: WO99/36456
  PCT Pub. Date: Jul. 22, 1999

(30) Foreign Application Priority Data

Jan. 19, 1998 (JP) .................................................. 10-007186

(51) Int. Cl.$^7$ .................................................. C08G 64/00
(52) U.S. Cl. ............................................................ 528/196
(58) Field of Search .............................................. 528/196

(56) References Cited

FOREIGN PATENT DOCUMENTS

| 0 010 602 | 5/1980 | (EP) . |
| 0 561 638 | 9/1993 | (EP) . |
| 37-18182 | 11/1960 | (JP) . |

Primary Examiner—Terressa M. Boykin
(74) Attorney, Agent, or Firm—Oblon, Spivak, McClelland, Maier & Neustadt, P.C.

(57) ABSTRACT

A polycarbonate resin having an improved hue is provided, which is suitable for use as a substrate for transfer type optical recording media such as optical disks.

The polycarbonate resin is one obtained by reacting starting materials comprising a dihydric phenol, a carbonate material, and a chain terminator comprising a p-(long chain)-substituted phenol (hereinafter referred to as a para isomer), characterized in that the amount of an o-(long chain)-substituted phenol (hereinafter referred to as an ortho isomer) contained as an impurity in the chain terminator used satisfies the following relationship:

$$\frac{\text{(ortho isomer amount)}}{\text{(para isomer amount)} + \text{(ortho isomer amount)}} \times 10^6 \leq 10^{(0.31 \times (\text{number of C's}) + 0.8)} \quad (i)$$

(wherein "number of C's" represents the number of carbon atoms in the substituent organic group of the substituted phenols).

7 Claims, No Drawings

POLYCARBONATE RESIN, OPTICAL-INFORMATION RECORDING MEDIUM SUBSTRATE MADE OF THE SAME, AND OPTICAL-INFORMATION RECORDING MEDIUM

TECHNICAL FIELD

The present invention relates to a polycarbonate resin, more particularly, a polycarbonate resin suitable for use as a substrate for transfer type optical information recording media such as optical disks. The present invention further relates to a substrate for optical information recording media which is formed from the polycarbonate resin and to an optical information recording medium employing the substrate.

BACKGROUND ART

Compared to conventional magnetic recording, optical recording, which is capable of noncontact recording and reproducing, is characterized by being less influenced by marring or fouling and is contributing greatly to an increase in storage capacity.

Recording media for use in this technique are constituted by forming an information recording layer on a transparent substrate made of, e.g., a polycarbonate resin. Polycarbonate resins are suitable for use as the material of substrates for the information recording media because they have satisfactory heat resistance in melt molding, reduced dimensional changes after molding, and excellent mechanical properties. In recent years, with the increasing storage capacity in this field where polycarbonate resins are used, the distance between pit tracks transferred to a transparent substrate is becoming shorter and the depth of the pits are becoming larger. As a result, it has become usual to mold polycarbonate resins at higher molding temperatures and higher mold temperatures. However, because of the insufficient heat resistance of the resins, molding at higher temperatures tends to yield low-molecular volatiles, which deposit on the stamper and replicas to cause bit errors, leading to serious problems. The higher-temperature molding further causes scorching due to resin deterioration, resulting in an increased error frequency in the final products. Because of such various problems, there has been a desire for a material which can be molded at a lower temperature. On the other hand, the mold temperature also is becoming higher so as to cope with the shorter distance between bit tracks and the larger depth of pits. However, as the mold temperature increases, the problem of warpage of molded substrates becomes severer. There has hence been a desire for a lower mold temperature as in the case of molding temperature.

Under these circumstances, polycarbonate resins have been strongly required to be a material which can be molded at a lower molding temperature and a lower mold temperature without impairing important properties possessed by disk substrates (birefringence, suitability for transfer, and warpage).

It has been well known in this respect that a polycarbonate resin which itself has improved flowability is obtained by using an alkylphenol in which the alkyl chain is longer than in the alkylphenols conventionally used as chain terminators for polycarbonate resins. For example, British Patent 965,457 discloses a technique of lowering melt viscosity by using a long-chain monohydric alcohol as a chain terminator, while U.S. Pat. No. 3,240,756 discloses the use of an alkylphenol as a terminator. In Unexamined Published Japanese Patent Application No. 51-34992 are given examples in which a phenol, acid chloride, acid, or alcohol having an alkyl group having 8 to 20 carbon atoms is used as a chain terminator to produce a polycarbonate having improved flowability. Recently, examples in which a polycarbonate resin having a long-chain alkyl group at each terminal is used as an optical molded article are given in Unexamined Published Japanese Patent Application No. 60-203632. The above references each states that an improvement in flowability is possible due to the long-chain alkyl groups present at molecular ends of the polycarbonate.

However, it has been found that such a polycarbonate obtained with a long-chain alkylphenol gives products having a far more yellowish hue as compared with those obtained from the polycarbonates produced with t-butylphenol, which has been conventionally employed, and that the polycarbonate is colored to such a degree that the molded products are unsuitable for use in optical recording media.

DISCLOSURE OF THE INVENTION

The present inventors have made intensive studies in order to eliminate the problems of the prior art techniques described above. As a result, the present invention has been achieved.

One essential aspect of the present invention resides in a polycarbonate resin obtained by reacting starting materials comprising a dihydric phenol, a carbonate material, and a chain terminator comprising a p-substituted phenol (hereinafter referred to as a para isomer) represented by the following general formula (I), characterized in that the amount of an o-substituted phenol (hereinafter referred to as an ortho isomer) contained as an impurity in the chain terminator used satisfies the following relationship (i):

$$\text{HO}-\!\!\left\langle\!\!\bigcirc\!\!\right\rangle\!\!-\text{R} \tag{I}$$

(wherein R is an organic group having 6 to 30 carbon atoms)

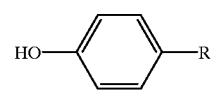

(wherein "number of C's" represents the number of carbon atoms in the substituent organic group of the substituted phenols).

Another essential aspect of the present invention resides in a polycarbonate resin obtained by reacting starting materials comprising a dihydric phenol, a carbonate material, and a chain terminator comprising a p-substituted phenol represented by the following general formula (I), characterized in that the polycarbonate resin, when molded at 360° C. and a cycle time of 180 seconds, gives molded objects (3.2 mm thick) having a YI of 2.5 or lower and a difference in YI between the first shot and the tenth shot (hereinafter referred to as ΔYI) of 0.8 or smaller:

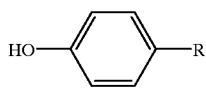

(I)

(wherein R is an organic group having 6 to 30 carbon atoms).

Still another essential aspect of the present invention resides in a substrate for optical information recording media which comprises the polycarbonate resin, and in an optical information recording medium employing the substrate.

BEST MODES FOR CARRYING OUT THE INVENTION

The polycarbonate resin of the present invention is produced by reacting starting materials comprising a dihydric phenol, a carbonate material, and a specific chain terminator, The dihydric phenol used in the present invention is a compound having two phenolic hydroxyl groups. This phenol is preferably a compound represented by the general formula HO—Z—OH, wherein Z is an organic group comprising one or more aromatic nuclei, and one or more of the hydrogen atoms bonded to the carbon atoms of the aromatic nuclei each may be replaced with a chlorine atom, bromine atom, aliphatic group, or alicyclic group. The aromatic nuclei may differ from each other in substituent. The aromatic nuclei may be bonded to each other with a crosslinking member. Examples of this crosslinking member include aliphatic groups, alicyclic groups, heteroatoms, and combinations of these.

Specific examples of the dihydric phenol include hydroquinone, resorcinol, dihydroxydiphenyl, bis (hydroxyphenyl)alkanes, bis(hydroxyphenyl)cycloalkanes, bis (hydroxyphenyl) sulfides, bis(hydroxyphenyl) ethers, bis(hydroxyphenyl) ketones, bis(hydroxyphenyl) sulfones, bis(hydroxyphenyl) sulfoxides, bis(hydroxyphenyl)dialkylbenzenes, and derivatives thereof in which one or more of the aromatic nuclei have one or more alkyl or halogen substituents. Two or more of these dihydric phenols can be used in combination.

These dihydric phenols and other appropriate dihydric phenols are given in, e.g., U.S. Pat. Nos. 4,982,014, 3,028,365, 2,999,835, 3,148,172, 3,275,601, 2,991,273, 3,271,367, 3,062,781, 2,970,131, and 2,999,846, German Offenlegungschrifts 1,570,703, 2,063,050, 2,063,052, and 2,211,956, and French Patent 1,561,518.

Preferred dihydric phenols include bisphenols containing two phenol residues in the skeleton, such as 2,2-bis(4-hydroxyphenyl)propane, 2,2-bis(3,5-dimethyl-4-hydroxyphenyl)propane, 1,1-bis(4-hydroxyphenyl) cyclohexane, and 1,1-bis(4-hydroxyphenyl)-3,3,5-trimethylcyclohexane.

The carbonate material used in the present invention is a compound capable of forming carbonate bonds

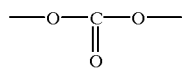

in a polycarbonate main chain through a polymer-forming reaction, e.g., a condensation reaction or exchange reaction. Examples thereof include phosgene and diphenyl carbonate.

Although processes for producing the polycarbonate resin in the present invention are not particularly limited, the interfacial polycondensation method using phosgene as a starting material is generally used. There also is a method in which phosgene is reacted with an alkylphenol to first produce a dialkylphenyl carbonate and this carbonate is reacted with a dihydric phenol under melt condensation conditions. However, this method, in which the molecular weight is increased by transesterification under the conditions of a melting temperature (up to 300° C.) and a high vacuum ($\leq$50 mmHg) while distilling the alkylphenol, is not always an industrially advantageous method because the distillation becomes difficult as the length of the alkyl chain in the alkylphenol becomes longer.

The chain terminator used in the present invention is a substituted phenol which has an organic group having 6 to 30 carbon atoms in the para position and is represented by the following general formula (I):

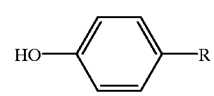

(I)

(wherein R is an organic group having 6 to 30 carbon atoms).

Examples of the organic group R include alkyl groups, aryl groups, alkenyl groups, alkoxyl groups, and alkoxyalkyl groups, and these substituents may be partly substituted with other atoms (O, S, N, etc.). The wide range of the number of carbon atoms is attributable mainly to processes for producing long-chain alkylphenols. In a generally frequently used reaction, phenol is caused to add the dimer of propylene or isobutene or the trimer or tetramer of propylene with the aid of an acid catalyst. However, in the case of the reaction of propylene tetramer, for example, the propylene tetramer material generally used has a molecular weight distribution comprising the tetramer as the main component and further containing smaller-molecular components and larger-molecular components. It is therefore impossible to limit the number of carbon atoms although the main component can be specified.

Preferred of the above phenol compounds are p-alkylphenols represented by the following general formula (II):

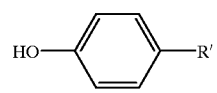

(II)

(wherein R' is an alkyl group having 6 to 30 carbon atoms). Specifically, alkylphenols such as t-octylphenol, octylphenol, nonylphenol, dodecylphenol, and 3-pentadecylphenol are preferred.

If the number of carbon atoms in the alkyl group is too small, the phenol compound is ineffective in improving flowability during melt molding and also in improving suitability for transfer in disk molding, although the impurity content is low and the product obtained has a satisfactory YI. If the number of carbon atoms therein is too large, the product obtained has an exceedingly reduced Tg, which is undesirable in that this may result in disk warpage depending on molding conditions. Consequently, the number of carbon atoms is from 6 to 30, preferably from 8 to 24, more preferably from 8 to 15, especially 12.

The present inventors have found that a chain terminator comprising such a p-substituted phenol (hereinafter referred to as a para isomer) contains an o-substituted phenol (hereinafter referred to as an ortho isomer), which differs from the para isomer in the position of the organic group substituent, as an impurity attributable to the process which has been used for producing the para isomer, and that by regulating the content of this ortho isomer, the hue of a polycarbonate resin product can be effectively improved. Namely, the hue of a polycarbonate resin is effectively improved by regulating a substituted phenol comprising the para isomer and the ortho isomer so that the proportion of the ortho isomer is not larger than a specific value.

Specifically, the amount of the ortho isomer contained preferably satisfies the following relationship (i):

$$\frac{\text{(ortho isomer amount)}}{\text{(para isomer amount)} + \text{(ortho isomer amount)}} \times 10^6 \leq 10^{(0.31 \times \text{(number of C's)} + 0.8)} \quad \text{(i)}$$

(wherein "number of C's" represents the number of carbon atoms in the substituent organic group of the substituted phenols). More preferably, the amount thereof satisfies the following relationship (ii):

$$\frac{\text{(ortho isomer amount)}}{\text{(para isomer amount)} + \text{(ortho isomer amount)}} \times 10^6 \leq 10^{(0.31 \times \text{(number of C's)} + 0.6)} \quad \text{(ii)}$$

(wherein "number of C's" represents the number of carbon atoms in the substituent organic group of the substituted phenols). Even more preferably, the amount thereof satisfies the following relationship (iii):

$$\frac{\text{(ortho isomer amount)}}{\text{(para isomer amount)} + \text{(ortho isomer amount)}} \times 10^6 \leq 10^{(0.31 \times \text{(number of C's)} + 0.5)} \quad \text{(iii)}$$

(wherein "number of C's" represents the number of carbon atoms in the substituent organic group of the substituted phenols). In each of the above relationships (i) to (iii), the left side indicates the proportion, in terms of ppm, of the ortho isomer in the substituted phenol. Hereinafter, this proportion is referred to as ortho isomer content.

If the ortho isomer content is too high, the polycarbonate resin product obtained has a considerably impaired hue. On the other hand, regulating the ortho isomer content to an exceedingly small value is undesirable from the standpoint of producing a substituted phenol, e.g., an alkylphenol, because the result is an impaired yield. By selecting any of the above relationships (i) to (iii) according to purposes, an excessive regulation can be avoided.

From the standpoint of producing a substituted phenol, e.g., an alkylphenol, a means generally effective in reducing the ortho isomer content therein may be fractionation by distillation. However, this fractionation is not an easy means because the para and ortho isomers basically have the same molecular weight. It is after all preferred to inhibit the ortho isomer from generating in the stage of reaction. For example, a satisfactory means for reducing the ortho isomer content is to prolong the reaction in an alkylation step conducted with the aid of an acid catalyst or to prolong an isomerization reaction (ortho isomer→para isomer).

The use amount of a chain terminator in producing a polycarbonate resin varies depending on the molecular weight of the target polycarbonate resin. However, in the case of the interfacial polycondensation method, for example, the amount thereof suitable for disk use is generally about from 1 to 9% by mole, preferably about from 4 to 8% by mole, more preferably about from 5 to 7% by mole, based on the amount of the dihydric phenol in the aqueous phase.

On the other hand, the time when a chain terminator is added is not particularly limited. However, if a chain terminator is added, for example, in the presence of phosgene, condensates of the chain terminator itself (diphenyl carbonate, etc.) generate in a large amount, undesirably resulting in the accumulation of a large amount of reaction products which are apt to volatilize at higher temperatures. On the other hand, if the addition of a chain terminator is delayed excessively, this is undesirable because molecular-weight control is difficult. It can be said in conclusion that the addition of a chain terminator is preferably conducted during the period from immediately after the termination of phosgene consumption to before the initiation of molecular-weight increase.

Any desired branching agent can be added in producing the polycarbonate resin. The branching agent to be used can be selected from various compounds having three or more functional groups. Appropriate examples of the branching agent include 2,4-bis(4-hydroxyphenylisopropyl)phenol, 2,6-bis(2'-hydroxy-5'-methylbenzyl)-4-methylphenol, 2-(4-hydroxyphenyl)-2-(2,4-dihydroxyphenyl)propane, and 1,4-bis(4,4'-dihydroxytriphenylmethyl)benzene, which are compounds each having three or more phenolic hydroxyl groups. Also included are 2,4-dihydroxybenzoic acid, trimesic acid, cyanuric chloride, bis(4-hydroxyphenyl)-2-oxo-2,3-dihydroxyindole, and 3,3-bis(4-hydroxy-3-methylphenyl)-2-oxo-2,3-dihydroindole, which are compounds each having three functional groups. Preferred of these are the compounds having three or more phenolic hydroxyl groups. Although the use amount of the branching agent varies depending on the desired degree of branching, it is generally from 0.05 to 2% by mole based on the amount of the dihydric phenol in the aqueous phase.

In producing the polycarbonate resin, an organic phase for dissolving the yielded polymer therein is used. This organic phase should comprise any desired inert organic solvent in which, at the reaction temperature and reaction pressure, phosgene and reaction products such as a carbonate oligomer and polycarbonate dissolve but water does not dissolve (in such a sense that the solvent does not give a solution with water).

Typical inert organic solvents include aliphatic hydrocarbons such as hexane and n-heptane, chlorinated aliphatic hydrocarbons such as methylene chloride, chloroform, carbon tetrachloride, dichloroethane, trichloroethane, tetrachloroethane, dichloropropane, and 1,2-dichloroethylene, aromatic hydrocarbons such as benzene, toluene, and xylene, chlorinated aromatic hydrocarbons such as chlorobenzene, o-dichlorobenzene, and chlorotoluene, and substituted aromatic hydrocarbons such as nitrobenzene and acetophenone. Preferably used among these are chlorinated hydrocarbons, e.g., methylene chloride or chlorobenzene.

These inert organic solvents can be used either alone or as a mixture with one or more other solvents.

The production of the above-described polycarbonate resin can be conducted in such a preferred manner that a condensation catalyst is fed during the contact of an aqueous phase with an organic phase prior to contact with phosgene to thereby form an emulsion in the presence of the condensation catalyst. It is a matter of course that a condensation catalyst may be fed during contact with phosgene if desired.

Any desired condensation catalyst can be selected from many condensation catalysts used in the interfacial polycondensation method. Especially preferred of these are trialkylamines, N-ethylpyrrolidone, N-ethylpiperidine, N-ethylmorpholine, N-isopropylpiperidine, and N-isopropylmorpholine. In particular, triethylamine and N-ethylpiperidine are suitable.

In the above process, there is no particular limitations on methods of reaction with phosgene, and a technique advantageous for thermal stability can be employed. For example, use can be made of a method in which the phosgene to be used is purified before use by removing free chlorine, which is a low-boiling impurity, from the phosgene by adsorption in order to improve the purity of the starting materials to be used, and a method in which methylene chloride (organic phase) and an alkali metal salt of a dihydric phenol (aqueous phase) as other feed materials are emulsified beforehand and this emulsion having an increased interfacial area is contacted with phosgene to thereby cause the reaction to proceed while keeping a growing monochloroformate predominant.

In this case, the aqueous phase to be emulsified should comprise at least three ingredients, i.e., water, a dihydric phenol, and an alkali metal hydroxide. In the aqueous phase, the dihydric phenol reacts with the alkali metal hydroxide, e.g., sodium hydroxide or potassium hydroxide, to yield a water-soluble alkali metal salt. Although it is, of course, preferred to mix the above three ingredients to prepare a homogeneous aqueous solution as an aqueous phase prior to contact with an organic phase, it is possible to mix part or all of these three ingredients during contact with an organic phase according to need. The molar proportion of the dihydric phenol to the alkali in the aqueous phase is preferably from 1:1.8 to 1:3.5, more preferably from 1:2.0 to 1:3.2. In preparing such an aqueous solution, the temperature thereof is preferably regulated to 20° C. or higher, preferably from 30 to 40° C. However, since use of too high a temperature results in oxidation of the dihydric phenol, it is preferred to use a lowest necessary temperature. In addition, it is preferred to conduct the solution preparation in a nitrogen atmosphere or to add a small amount of a reducing agent, e.g., hydrosulfite.

The reaction temperature in obtaining an oligomer is 80° C. or lower, preferably 70° C. or lower, more preferably in the range of from 10 to 65° C. If the reaction temperature is too high, side reactions cannot be inhibited, resulting in an impaired phosgene material unit. On the other hand, too low reaction temperatures are undesirable in that the refrigeration load is increased to cause a cost increase, although preferred from the standpoint of reaction control.

In the stage where an oligomer is obtained, the organic phase may have any value of oligomer concentration as long as the oligomer obtained is soluble. Specifically, the oligomer concentration is about from 10 to 40% by weight. The proportion of the organic phase to the aqueous solution of an alkali metal hydroxide of the dihydric phenol, i.e., to the aqueous phase, is preferably from 0.2 to 1.0 in terms of volume ratio. The oligomer obtained under such condensation conditions has an average molecular weight (Mv) of generally about from 500 to 10,000, preferably from 1,600 to 4,500. However, the average molecular weight thereof is not particularly limited.

The oligomer thus obtained is converted to a high-molecular polycarbonate under polycondensation conditions in an ordinary manner. In a preferred embodiment, the organic phase containing the oligomer dissolved therein is separated from the aqueous phase and any of the aforementioned inert organic solvents is added thereto according to need to regulate the concentration of the oligomer. Specifically, the amount of the solvent is regulated so that the concentration in the organic phase of the polycarbonate to be obtained through polycondensation will be generally from 5 to 30% by weight. Thereafter, an aqueous phase comprising water and an alkali metal hydroxide is freshly added and the condensation catalyst is preferably added in order to further regulate the polycondensation conditions. The desired polycondensation is then completed by the interfacial polycondensation method. The proportion of the organic phase to the aqueous phase during the polycondensation is preferably about from 1:0.2 to 1:1 in terms of the volume ratio of the organic phase to the aqueous phase.

After completion of the polycondensation, the organic phase is washed with an alkali such as NaOH until the residual chloroformate groups are diminished to, e.g., 0.1 $\mu$mol/g or below. Thereafter, the organic phase is washed until all the electrolytes are removed. Finally, the inert organic solvent is removed from the organic phase in a suitable manner to isolate the polycarbonate. The polycarbonate thus obtained generally has an average molecular weight (Mv) of about from 10,000 to 100,000. However, the Mv of the polycarbonate suitable for disk use is generally from 13,000 to 20,000, preferably about from 14,000 to 18,000.

In the case where polycarbonates are formed into optical molded objects, a higher molding temperature should be selected according to the bit distance and depth in the stamper to be used. However, as in the case of the above-described object resin of the present invention, for which a special substituted phenol, especially an alkylphenol, had to be selected, the molding temperature to be selected is generally about from 340 to 400° C., preferably about from 350 to 390° C., more preferably about from 360 to 385° C., so as to cope with considerably increased storage capacities.

In this specification, the average molecular weight (Mv) of an oligomer or polycarbonate is a value calculated from the concentration (C) thereof (0.6 g/dl solution in methylene chloride) and the specific viscosity ($\eta$sp) determined at a temperature of 20° C., using the following two equations.

$$\eta sp/C=[\eta](1+0.28\eta sp)$$

$$[\eta]=1.23\times10^{-5}\times Mv^{0.83}$$

Various additives can be added in effective amounts to the polycarbonate resin obtained by the method described above, during the separation thereof from the reactor or before or during the processing thereof. Examples thereof include stabilizers, release agents, combustion retarders, antistatic agents, fillers, fibers, and impact strength modifiers.

These polycarbonate resins can be processes by injection molding, extrusion molding, or the like into various molded objects, e.g., films, fibers, and boards. Such objects are used in various technical fields, e.g., the electric part or building industry, and as materials for lighting appliances and materials for optical apparatuses, in particular, the housings of illuminators, optical lenses, optical disks, and audio disks. The polycarbonate resins are advantageously used especially in the optical field for which high-temperature molding is necessary.

Optical information recording media generally employ a polycarbonate resin as substrates. Known are optical disks for reproducing only (CD, CD-ROM, DVD-ROM, etc.), optical disks for recording and reproducing (write-once type: CD-R, DVD-R, etc.) and optical disks for recording, reproducing, erasing, and rewriting (rewritable type: MO, CD-RW, DVD-RAM, etc.).

EXAMPLES

The present invention will be explained below in detail by reference to Examples, but the invention should not be construed as being limited thereby unless the invention departs from the spirit thereof.

Symbols or abbreviations having the following meanings are used in the Examples.

| Symbols or abbreviations | Meaning |
| --- | --- |
| BPA | Bisphenol A |
| BPA-Na | Sodium salt of bisphenol A |
| GPC | Gel permeation chromatography |

Examples 1 to 5

An aqueous phase prepared by dissolving 16.31 kg/hr bisphenol A, 5.93 kg/hr NaOH, and 101.1 kg/hr water in the presence of 0.018 kg/hr hydrosulfite at 35° C. and cooling the solution to 25° C. and an organic phase consisting of 68.0 kg/hr methylene chloride cooled to 5° C. were fed to a stainless-steel piping having an inner diameter of 6 mm and an outer diameter of 8 mm to mix the two phases within the piping. This mixture was emulsified with a homomixer (trade name, T.K Homomic Line Flow Type LF-500; manufactured by Tokushu Kika Kogyo Co., Ltd.) to prepare an emulsion.

The thus-obtained emulsion consisting of an aqueous BPA-Na solution (aqueous phase) and methylene chloride (organic phase) was taken out of the homomixer through a piping having an inner diameter of 6 mm and an outer diameter of 8 mm and extending from the homomixer. This emulsion was introduced into a pipe reactor made of Teflon which had an inner diameter of 6 mm and a length of 34 m and had been connected to the piping, and was then contacted therein with 7.5 kg/hr liquefied phosgene separately introduced thereinto through a pipe cooled to 0° C. This liquefied phosgene used was one which had been treated by packing a cylindrical vessel having a diameter of 55 mm and a height of 500 mm with activated carbon (trade name, Yashicoal S; manufactured by Taihei Chemical Industrial Co., Ltd.; properties are shown below) and passing the phosgene through the vessel at −5° C., 7.2 kg/hr, and an SV of 3.

| Activated carbon used: | |
| --- | --- |
| Particle size | 30–60 mesh |
| True density | 2.1 g/cc |
| Porosity | 40% |
| Specific surface area | 1,200 m$^2$/g |
| Pore volume | 0.86 cc/g |

The feed materials were passed together with the phosgene through the pipe reactor at a linear velocity of 1.7 m/sec over a period of 20 seconds, during which phosgene reaction and oligomerization reaction were conducted. In this stage, the reaction temperature was regulated to 60° C. in each reaction and the reaction mixture was externally cooled to 35° C. before being introduced into the subsequent oligomerization vessel.

The emulsion obtained from the pipe reactor, which had undergone oligomerization, was introduced into a reaction vessel having a capacity of 50 liters and equipped with a stirrer. The emulsion was then stirred in an $N_2$ atmosphere at 30° C. to conduct oligomerization, whereby the unreacted BPA-Na present in the aqueous phase was completely consumed. Thereafter, the aqueous phase and organic phase were separated from each other by standing to obtain a methylene chloride solution of an oligomer. For the oligomerization, triethylamine as a catalyst was introduced into the oligomerization vessel in an amount of 0.005 kg/hr, and the alkylphenol whose kind and amount (mol % (based on the dihydric phenol)) are shown in Table 1 was further introduced thereinto as a chain terminator. The ortho isomer content (ppm) of the alkylphenol is also shown in Table 1.

The dodecylphenol used in Examples 3 to 5 was produced in the following manner.

Feedstock dodecene heated to 50° C. was mixed with phenol heated likewise (4 mol per mol of the dodecene). This liquid mixture was passed through a column of an acid ion-exchange resin to conduct alkylation reaction. Since this alkylation was accompanied by heat generation, the liquid mixture was passed while removing heat therefrom in an amount corresponding to the heat generation. The reaction mixture thus obtained was fed to a reaction column likewise packed with an acid ion-exchange resin to isomerize the reaction product for converting the ortho isomer to the para isomer.

The dodecylphenol thus obtained was treated with a distillation column for initial phenol separation to remove the phenol, and then with another column to remove heavy ends, e.g., the dialkylated phenol, as impurities. Thus, a dodecylphenol product was obtained.

The alkylphenols used in the Examples each was one for which the ortho isomer being yielded was diminished by prolonging the ordinary periods of the alkylation reaction and the isomerization reaction to two times or more.

A 23 kg portion of the above oligomer solution in methylene chloride was introduced into a reaction vessel having a capacity of 70 liters and equipped with a Pfaudler blade. Thereto was added 10 kg of methylene chloride for dilution, followed by 2.2 kg of 25 wt % aqueous NaOH solution, 6 kg of water, and 2.2 g of triethylamine. The resultant mixture was stirred at 30° C. in an $N_2$ atmosphere to conduct polycondensation reaction for 60 minutes. Thus, a reaction mixture containing a polycarbonate was obtained.

To this reaction mixture were added 30 kg of methylene chloride and 7 kg of water. After the resultant mixture was stirred for 20 minutes, the stirring was stopped to separate the organic phase from the aqueous phase. To the separated organic phase was added 20 kg of 0.1 N hydrochloric acid. This mixture was stirred for 15 minutes to extract the triethylamine and the alkali ingredient remaining in a small amount. Thereafter, the stirring was stopped to separate the organic phase from the aqueous phase. Furthermore, 20 kg of pure water was added to the separated organic phase and this mixture was stirred for 15 minutes, before the stirring was stopped to separate the organic phase from the aqueous phase. This operation was repeated (three times in total) until chlorine ions came not to be detected in the extractant water.

The thus-obtained purified polycarbonate solution was granulated with a kneader and dried to obtain a granular powder (flakes).

These flakes were kneaded with a 30-mm twin-screw extruder (manufactured by Ikegai Corp.) at a resin temperature of 290° C. in an $N_2$ atmosphere and then pelletized (15 kg/hr). This treatment was conducted while taking sufficient care to avoid operational impurity inclusion (impurities derived from the hands and sweat of workers and from cooling water).

The flakes obtained in each Example were examined for average molecular weight and molecular weight distribution. Furthermore, the pellets were examined for color tone. The results obtained are shown in Table 1.

The polycarbonate properties shown in the table were evaluated in the following manners.

<1> Molecular Weight Distribution (Mw/Mn):

Using a GPC apparatus (trade name, HLC-8020; manufactured by Tosoh Corp.) and tetrahydrofuran (THF) as an eluent, each polycarbonate was fractionated with four columns respectively packed with four packings for high-performance GPC (trade name, TSK 5000HLX, 4000HLX, 3000HLX, and 2000HLX; manufactured by Tosoh Corp). Detection was conducted based on a difference in refractive index. From the chart thus obtained, the weight-average molecular weight (Mw) and the number-average molecular weight (Mn) were determined in terms of standard polystyrene. The value of Mw/Mn was calculated therefrom.

<2> Color Tone (YI):

<Molding of Sample Plate>

The pellets obtained in the above-described manner were plasticated with an injection molding machine (trade name, JSW J75EII; manufactured by the Japan Steel Works, Ltd.) at 360° C., subsequently allowed to reside in the cylinder for 180 seconds, and then molded into 60 mm-square sample plates each having a thickness of 3.2 mm.

<Determination of Color Tone>

The sample plates obtained respectively by the first and tenth shots in the above molding were examined for color tone (YI (yellowness index)) with a color difference meter (trade name, CM-3700D; manufactured by Minolta Co., Ltd.), and the difference therebetween (ΔYI) was determined. Smaller found values of YI for the first shot indicate that molded objects having a satisfactory color tone are obtained in steady-state molding, while smaller differences in YI (ΔYI) between the first and the tenth shots indicate that the molding material has satisfactory high-temperature thermal stability.

<3> Melt Viscosity:

A capillograph (trade name, Capillograph 1B; manufactured by Toyo Seiki Seisaku-Sho, Ltd.) was used as a means for comparing melt flowability. The melt viscosity was measured under the conditions of L (orifice length)/D (orifice diameter)/B (barrel diameter)=40/1/9.55 (mm), 250° C., and a shear rate y of 100 ($sec^{-1}$).

<4> Total Light Transmittance (ASTM D1003):

The 3.2 mm-thick sample plate described above was examined for total light transmittance as a measure of transparency, which is required of disk substrates. Smaller values of total light transmittance indicate that the samples are insufficient in the transparency originally possessed by polycarbonates; such samples can be judged to be unsuitable for use as optical materials.

<5> Comparison in Transferability from Stamper in Disk Molding and Evaluation of Substrate Properties:

Using molding machine SD30, manufactured by Sumitomo Heavy Industries, Ltd., a substrate having a diameter of 120 mm and a thickness in the recording region of 0.6 mm was molded under the following conditions. The stamper used was one conforming to 4.7 GB DVD-R.

This stamper had a track pitch of 0.74 μm and a groove depth of 170 nm.

| | |
|---|---|
| Cylinder temperature | 385° C. |
| Mold temperature | 130° C./124° C. |
| Charging time | 0.09 sec |
| Cooling time | 9.0 sec |
| Compression force (ton) | 20-12-8-5 |

After the polycarbonate substrate was molded under these conditions, the depth of the grooves transferred thereto was measured with respect to the outermost groove in the recording region. Thus, transferability was compared.

<Birefringence>

The maximum and the minimum values of in-plane birefringence were measured with automatic birefringence analyzer ADR-130N, manufactured by Oak Seisaku-sho.

<Mechanical Property>

The mechanical properties of the substrate were evaluated according to specifications for DVD-R (DVD Specifications for Recordable Disc/Part. 1 Physical Specifications Ver. 1.0 July 1997).

The samples which satisfied the specifications with a sufficient margin are indicated by ○, while those which barely satisfied the specifications are indicated by Δ.

Comparative Examples 1 to 4

The same procedure as in Example 1 was conducted, except that the alkylphenols shown in Table 1 were used as chain terminators. All the alkyd phenols used h ad been treated in the ordinary reaction time and ordinary isomerization time; most of the commercial products generally available have the same compositions as those.

Comparative Example 5

The same procedure as in Comparative Example 1 was conducted, except that the cylinder temperature and the mold temperature during molding were changed to 395° C. and 132° C./126° C., respectively.

TABLE 1

| | Example 1 | Example 2 | Example 3 |
|---|---|---|---|
| Kind of alkylphenol | t-octylphenol | t-octylphenol | dodecylphenol |
| Addition amount (mol % based on dihydric phenol) | 6.1 | 3.9 | 6.3 |
| Ortho isomer content (ppm) | 1,100 | 960 | 19,200 |
| Calculated value of right side of relationship (i) | 1,905 | 1,905 | 33,113 |
| Average molecular weight of yielded polymer (Mv) | 15,200 | 21,100 | 15,300 |
| Molecular weight distribution (Mw/Mn) | 2.67 | 2.78 | 2.72 |
| YI: 1st shot (360° C.; cycle time, 180 sec) | 2.0 | 1.6 | 1.95 |
| YI: 10th shot (360° C.; cycle time, 180 sec) | 2.5 | 1.95 | 2.40 |
| ΔYI | 0.5 | 0.35 | 0.45 |

TABLE 1-continued

| | | | | |
|---|---|---|---|---|
| Melt viscosity (250° C. aty = 100 sec$^{-1}$) | | 11,000 | — | 9,000 |
| Total light transmittance | | 91 | 91 | 91 |
| Substrate Properties | Depth of transferred groove (nm) | 160 | — | 170 |
| | In-plane birefringence (×10$^6$) Min–Max | −9 to 29 | — | −13 to 20 |
| | Mechanical property | ⊚ | — | ⊚ |

*Substrate properties: with respect to transfer, numerals close to 170 nm are satisfactory; with respect to birefringence, smaller values of Min–Max difference are satisfactory.

| | Example 4 | Example 5 | Comparative Example 1 |
|---|---|---|---|
| Kind of alkylphenol | dodecylphenol | dodecylphenol | t-butylphenol |
| Addition amount (mol % based on dihydric phenol) | 4.0 | 6.3 | 5.9 |
| Ortho isomer content (ppm) | 15,600 | 15,300 | 60 |
| Calculated value of right side of relationship (i) | 33,113 | 33,113 | 110 |
| Average molecular weight of yielded polymer (Mv) | 21,500 | 15,100 | 15,600 |
| Molecular weight distribution (Mw/Mn) | 2.80 | 2.62 | 2.68 |
| YI: 1st shot (360° C.; cycle time, 180 sec) | 1.72 | 1.65 | 1.35 |
| YI: 10th shot (360° C.; cycle time, 180 sec) | 2.06 | 2.03 | 1.68 |
| ΔYI | 0.34 | 0.38 | 0.33 |
| Melt viscosity (250° C. aty = 100 sec$^{-1}$) | — | 9,000 | 12,000 |
| Total light transmittance | 91 | 91 | 92 |
| Substrate Properties Depth of transferred groove (nm) | — | 170 | 100 |
| In-plane birefringence (×10$^6$) Min–Max | — | −10 to 15 | −11 to 29 |
| Mechanical property | —⊚ | ⊚ | ⊚ |

*In Comparative Example 1 in the table, since the alkyl substituent of the phenol had a small number of carbon atoms, the polymer had poor melt flowability and was inferior in transferability as shown under Substrate Properties.
*Substrate properties: with respect to transfer, numerals close to 170 nm are satisfactory; with respect to birefringence, smaller values of Min–Max difference are satisfactory.

| | Comparative Example 2 | Comparative Example 3 | Comparative Example 4 | Comparative Example 5 |
|---|---|---|---|---|
| Kind of alkylphenol | t-octylphenol | dodecylphenol | nonylphenol | t-butylphenol |
| Addition amount (mol % based on dihydric phenol) | 6.1 | 6.3 | 6.2 | 5.9 |
| Ortho isomer content (ppm) | 2,200 | 35,800 | 5,600 | 60 |
| Calculated value of right side of relationship (i) | 1,905 | 33,113 | 3,890 | 110 |
| Average molecular weight of yielded polymer (Mv) | 15,400 | 15,800 | 15,200 | 15,400 |
| Molecular weight distribution (Mw/Mn) | 2.68 | 2.70 | 2.68 | 2.69 |
| YI: 1st shot (360° C.; cycle time, 180 sec) | 3.2 | 4.6 | 5.5 | 1.32 |
| YI: 10th shot (360° C.; cycle time, 180 sec) | 4.1 | 5.8 | 6.8 | 1.68 |
| ΔYI | 0.9 | 1.2 | 1.3 | 0.36 |
| Melt viscosity (250° C. aty = 100 sec$^{-1}$) | 9,500 | 9,200 | 9,000 | 12,000 |
| Total light transmittance | 89 | 88 | 88 | 92 |
| Substrate Properties Depth of transferred groove (nm) | 160 | 170 | 170 | 160 |
| In-plane birefringence (×10$^6$) Min–Max | −12 to 26 | −10 to 25 | −15 to 22 | −15 to 16 |
| Mechanical property | ⊚ | ⊚ | ⊚ | Δ |

*In Comparative Examples 2 to 4, since the alkylphenols had high ortho isomer contents, the substrates had a very poor hue and were unsuitable for use as substrates, although flowability and transferability were satisfactory.
*In Comparative Example 5, the substrate had poor mechanical properties because the alkylphenol used had a small number of carbon atoms and molding was conducted under severer conditions.
*Substrate properties: with respect to transfer, numerals close to 170 nm are satisfactory; with respect to birefringence, small values of Min–Max difference are satisfactory.

Possibility of Industrial Application

The polycarbonate resin of the present invention has an average molecular weight of generally from 10,000 to 100,000. It not only gives molded objects having excellent properties inherent in polycarbonate resins, but has an advantage that given molded articles are obtained therefrom at lower molding temperatures because it shows significantly improved flowability during molding. In addition, less colored molded objects can be obtained therefrom. Consequently, the polycarbonate resin has an advantage of being usable in a far wider range of applications than conventional polycarbonate resins. Furthermore, since the polycarbonate resin has an advantage of being excellent in transferability from molds or stampers even at low molding temperatures, it is possible to obtain less deteriorated products in a high yield.

What is claimed is:

1. A polycarbonate resin comprising the reaction product of a dihydric phenol, a carbonate material, and a chain terminator comprising a p-substituted phenol (hereinafter referred to as a para isomer) represented by the following general formula (I), characterized in that the amount of an o-substituted phenol (hereinafter referred to as an ortho isomer) contained as an impurity in the chain terminator used satisfies the following relationship (i):

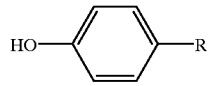
(I)

(wherein R is an organic group having 6 to 30 carbon atoms)

$$\frac{\text{(ortho isomer amount)}}{\text{(para isomer amount)} + \text{(ortho isomer amount)}} \times 10^6 \leq 10^{(0.31 \times \text{(number of C's)} + 0.8)}$$ (i)

(wherein "number of C's" represents the number of carbon atoms in the substituent organic group of the substituted phenols).

2. The polycarbonate resin of claim 1, which when molded at 360° C. and a cycle time of 180 seconds gives molded objects (3.2 mm thick) having a YI of 2.5 or lower and a difference in YI between the first shot and the tenth shot (hereinafter referred to as $^\Delta$YI) of 0.8 or smaller.

3. A polycarbonate resin obtained by reacting starting materials comprising a dihydric phenol, a carbonate material, and a chain terminator comprising a p-substituted phenol represented by the following general formula (I), said polycarbonate resin, when molded at 360° C. and a cycle time of 180 seconds, giving molded objects (3.2 mm thick) having a YI of 2.5 or lower and a difference in YI between the first shot and the tenth shot (hereinafter referred to as ΔYI) of 0.8 or smaller:

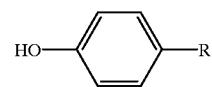
(I)

(wherein R is an organic group having 6 to 30 carbon atoms).

4. The polycarbonate resin of claim 2, wherein the YI is 1.8 or lower and the ΔYI is 0.5 or smaller.

5. The polycarbonate resin of claim 1, wherein the p-substituted phenol as the chain terminator is a p-alkylphenol represented by the following general formula (II):

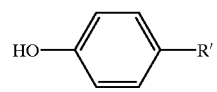
(II)

(wherein R' is an alkyl group having 6 to 30 carbon atoms).

6. A substrate for optical information recording media which comprises the polycarbonate resin of claim 1.

7. An optical information recording medium comprising a substrate comprising the polycarbonate resin of claim 1 and an optical information recording layer formed on the substrate.

* * * * *